United States Patent [19]
Mrotek et al.

[11] Patent Number: 5,705,259
[45] Date of Patent: Jan. 6, 1998

[54] METHOD OF USING A BIPOLAR ELECTROCHEMICAL STORAGE DEVICE

[75] Inventors: Edward N. Mrotek, Grafton; Benjamin Reichman, Bayside, both of Wis.

[73] Assignee: Globe-Union Inc., Milwaukee, Wis.

[21] Appl. No.: 547,833

[22] Filed: Oct. 25, 1995

Related U.S. Application Data

[63] Continuation of Ser. No. 341,023, Nov. 17, 1994, abandoned.

[51] Int. Cl.[6] ............................................. B32B 9/00
[52] U.S. Cl. ........................ 428/209; 428/220; 428/408; 428/457; 428/373; 428/901; 429/210; 429/234; 429/245; 204/280
[58] Field of Search .................................... 428/220, 209, 428/408, 457, 323, 901; 429/210, 234, 245; 204/280

[56] References Cited

U.S. PATENT DOCUMENTS

| | | | |
|---|---|---|---|
| 3,795,543 | 3/1974 | Poe | 429/210 |
| 4,098,967 | 7/1978 | Biddick | 429/210 |
| 4,124,747 | 11/1978 | Murer | 428/220 |
| 5,017,446 | 5/1991 | Reichman et al. | |
| 5,045,170 | 9/1991 | Bullock | 204/280 |
| 5,106,709 | 4/1992 | Tekkanat et al. | |
| 5,173,362 | 12/1992 | Tekkanat et al. | |

FOREIGN PATENT DOCUMENTS

| | | |
|---|---|---|
| 62-115666 | 5/1987 | Japan. |
| 63-314760 | 12/1988 | Japan. |

*Primary Examiner*—Patrick Ryan
*Attorney, Agent, or Firm*—Harness, Dickey & Pierce, P.L.C.

[57] ABSTRACT

A double layer structure for use as a capacitor or battery electrode, for use in other electrochemical systems, includes in one embodiment a first layer containing conductive transition metal oxides and a second layer which includes conductive carbon embedded in a suitable binder. For capacitor and lead-acid battery applications the transition metal containing material is used as the negative terminal substrate. Another embodiment includes a carbon layer on an electrode surface, the electrode being made from the transition metal oxide in a binder. The last mentioned carbon layer is thin, inexpensive and more conductive than a laminate layer in which the carbon is imbedded in a self-supporting binder.

19 Claims, 1 Drawing Sheet

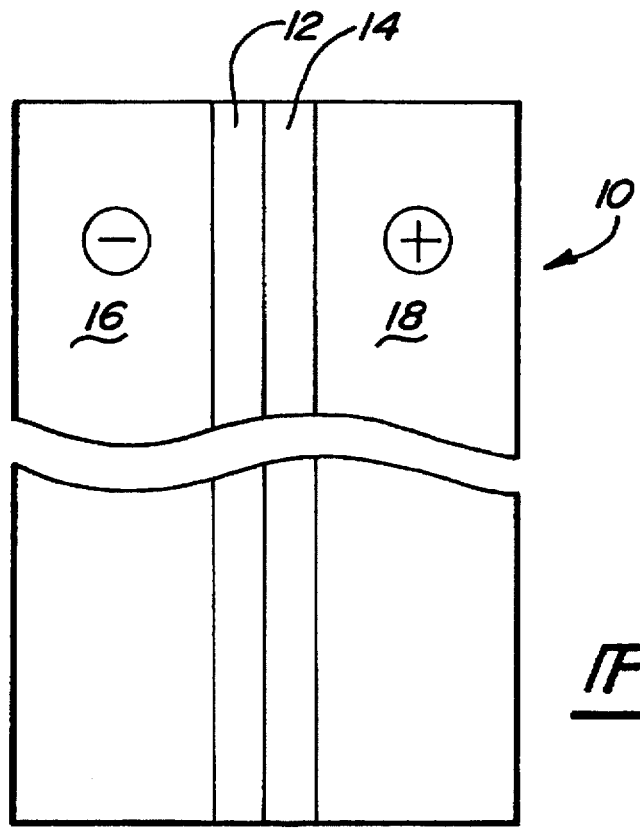
_Fig-1_
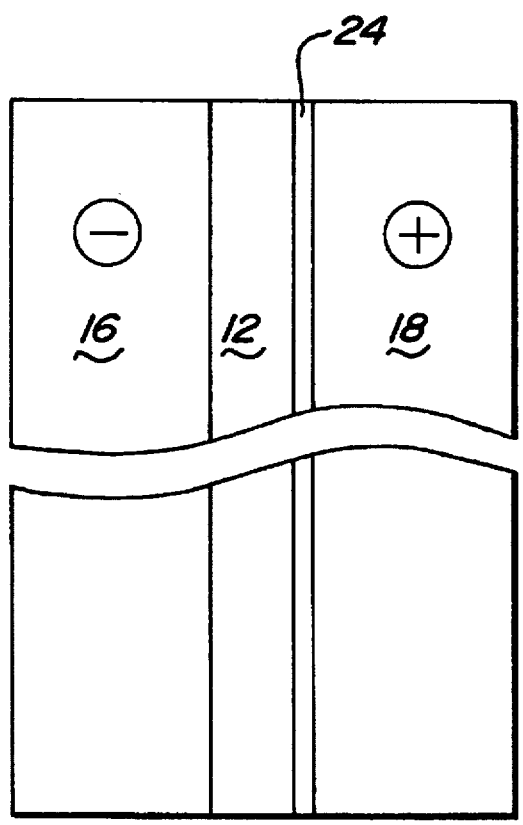
_Fig-2_

METHOD OF USING A BIPOLAR ELECTROCHEMICAL STORAGE DEVICE

This is a continuation of Application Ser. No. 08/341,023 filed Nov. 17, 1994, abandoned.

BACKGROUND OF THE INVENTION

1. Field of the Invention

The present invention relates generally to the art of storage batteries and other electrochemical devices where an electrode substrate is used, e.g. in fuel cells, in capacitors and the like. Still more specifically, the present invention relates in one embodiment to the use of a double layer bipolar capacitor in which a transition metal oxide in a suitable binder is used as the negative terminal in the electrode structure and preferably carbon is used as the conductor material for the positive terminal. In another embodiment, the carbon may be applied in a thin layer onto the surface of the transition metal containing negative electrode.

2. Description of the Prior Art

A number of composite electrode structures are known for use in bipolar electrodes for application in battery cells and other devices where electrochemical reactions take place, such as in electrolysis systems, fuel cells and the like.

One prior form of battery substrate includes overlying layers of binder material containing particulate conductive material. In one form of the disclosed substrate, the conductive material in one layer is carbon, while the conductive material for the other layer comprises a conductive form of a transition metal oxide or barium metaplumbate. In the description of this device it is stated that the layer containing the conductive form of a transition metal oxide is used for the positive electrode, while the carbon is used for the negative. The patent describing the device is U.S. Pat. No. 5,106,709 issued Apr. 21, 1992 to Tekkanat, et al. and entitled "Composite Substrate For Bipolar Electrode".

Another composite structure useful for such applications is the one disclosed in Reichman, et al., U.S. Pat. No. 5,017,446 issued May 21, 1991 and entitled "Electrodes Containing Conductive Metal Oxides". In this device, the electrode is stable in aqueous solutions of sulfuric acid and does not participate in the electrode reactions. The conductive oxides include those of titanium, tungsten, molybdenum, vanadium and niobium, each combined with a resin binder. This patent also suggests that in lead-acid battery construction, the conductive material serves as an additive which enhances the formation of lead-acid battery plates on the positive side. It is also suggested that the combination may serve as a binder for substrate materials used in bipolar battery construction. In this case, layers of positive and negative active battery material are disposed on opposite sides of the substrate containing the transition metal oxide.

Yet another "Composite Substrate For Bipolar Electrodes" is disclosed in U.S. Pat. No. 5,173,362 issued Dec. 22, 1992 to Tekkanat, et al. In this device the electrode system is preferably used for bipolar electrodes in zinc-bromine batteries, and the substrates include carbon-black as a conductive filler along with reinforcing materials such as glass. Various lamination processes are used to force the materials into a glass mat substrate for improved performance.

Japanese Publication No. 62-115666 discloses a high energy density nonaqueous electrolyte secondary battery which uses alkali metals such as lithium as the negative active material and which allegedly achieves high utilization and improved cycle life by employing $MoO_2$ powder as a conductor. The abstract indicates that the powder acts as a conductor and prevents decomposition during exposure to electrolyte. The conductive powder is used to replace metallic copper or titanium powder in prior devices.

Yet another Japanese Publication No. 63-314760 relates to "Organic Electrolyte Cell Using Composite Material As Positive Electrode." In this device an aniline polymer and a transition metal oxide are used in a positive electrode. A compact package maintaining a large capacity after repeated charge and discharge is obtained. Note again, the use of this material is for the positive electrode in a battery system.

While the use of conductive forms of transition metal oxides in electrochemical systems have been disclosed in the prior art, the teachings of the aforementioned patents direct the user to employ them as part of the positive substrate (i.e. the surface to which the positive active battery paste is applied). In such environment, i.e. positive polarization in an acidic environment (e.g. sulfuric acid in lead-acid batteries), we have now found the transition metal oxides to be unstable. Moreover, the previously suggested combinations do not appreciate certain conductivity factors which could be utilized to advantage if the transition metal oxide layer were used for the negative electrode. Further, the prior teachings fail to recognize the advantages and flexibility of using a binder layer containing a conductive form of a transition metal oxide in combination with other electrode structures. Accordingly, the full potential of electrode structures utilized conductive forces of transition metal oxides has not been fully appreciated or disclosed. Improved electrode structures taking optimum advantage of such transitional metal oxide systems would represent a significant advance in the art.

SUMMARY OF THE INVENTION

The present invention features a variety of electrode structure using conductive forms of transition metal oxides or barium metaplumbate, as a part of the negative polarity substrate of bipolar batteries, electrochemical capacitors (i.e., double layer capacitors) and other systems in which electrochemical reactions take place. The present invention also features the use of such oxides or barium metaplumbate in a lightweight, highly conductive system which allows system designers to obtain high energy and power densities. Still further the present invention features a variety of novel electrode arrangements utilizing the highly conductive nature of the aforementioned inorganic materials, including laminates thereof with carbon filled binder layers or conductive carbon layers applied by techniques other than resin lamination.

How the features of the present invention are accomplished will be described in connection with the following detailed description of the preferred embodiments, taken in conjunction with the figures. Generally, however, they are accomplished by employing conductive forms of transition metal oxides or barium metaplumbate at the negative side of a bipolar battery, a double layer capacitor or as part of other negative electrode at which electrochemical reactions take place. Preferably, these materials will be dispersed in a resin binder at a loading level sufficient to provide the desired level of conductivity. In one embodiment, this material (hereinafter referred to as the "oxide layer") is combined with another resin layer containing conductive carbon powder, and the combined laminate is used to support

3 positive and negative active battery/capacitor paste. This structure is also arranged so that the oxide layer will support the negative active paste material. In another embodiment, a thin carbon containing layer is applied to the oxide layer, and in yet further embodiments, the positive layer will be applied to the oxide layer with other binders in a brushed, coated, or sprayed form, to yield inexpensive, highly conductive combinations with good performance characteristics in the harsh environments encountered in electrochemical systems.

Other ways in which the features of the present invention are accomplished will be appreciated by those skilled in the art after reading the balance of this specification. Such other ways are deemed by us to be within the scope of our invention.

DESCRIPTION OF THE FIGURES

FIG. 1 is a schematic illustration of one preferred form of the present invention showing the oxide layer in a laminate substrate combination with a carbon-binder layer and active battery paste materials applied to each side of the laminate; and FIG. 2 is a schematic illustration of a second preferred form of the present invention showing the oxide layer combined with a thin carbon layer, with active battery paste material applied to each side of the combination.

In the figures, like reference numerals are used to indicate like components.

DETAILED DESCRIPTION OF THE PREFERRED EMBODIMENT

Before beginning the description of the most preferred embodiments of the present invention, several comments are in order as to the general applicability and scope thereof. First, this specification will not contain detailed descriptions of the conductive particulate materials or resin binders (e.g., Eccocoat 258A ink) to be used, primarily because complete descriptions are contained in the Reichman, et al ('446) and Tekkanat, et al. ('709 and '362) patents referred to in the Background section of this specification. Those patents are expressly incorporated into this description by this reference.

Second, the present invention will be illustrated in connection with a bipolar electrochemical double-layer capacitor, i.e. where conductive substrates made according to the present invention are pasted on opposite sides with activated carbon paste materials. However, the conductive layer combinations of the present invention have a much wider applicability in other battery applications or for other applications where electrochemical reactions take place, e.g. in fuel cells, for electrolysis and the like.

According to the present invention, and for definitional purposes, a class of "conductive metal oxides" are employed which are described more particularly in the aforementioned Tekkanat, et al. '709 patent, i.e. barium metaplumbate and certain transition metal oxides which are reduced from their more stable, and non-conductive states, in a hydrogen atmosphere at elevated temperatures. The most preferred conductive metal oxides for use in this invention include conductive metal oxides of titanium, tungsten, molybdenum, vanadium, niobium and barium metaplumbate.

Preferred binders for such conductive metal oxides are polyethylene, polypropylene, fluorinated derivatives thereof and similar resins having suitable strength and resistance to sulfuric acid. Most preferred is a high-density polyethylene having a molecular weight of from 200,000 to 300,000.

4

The particle size of the conductive metal oxide can vary, with the preferred range being from about 0.1 to 300 microns, preferably 0.1 to 40 microns and still more preferably 0.1 to 5 microns. In terms of the mixture percentage, the conductive metal oxide is used in an amount preferably from about 10% to about 95% by volume, particularly from about 15% to 60% by volume.

When the conductive oxide layer of the present invention is used with an adjoining carbon-resin layer, the carbon is preferably carbon black, the resin binder is selected from the binders useful for the conductive metal oxide layer and the fill rates may be in the same ranges referred to for that layer.

The conductive oxide layer of the present invention can also be employed in combination with a thin layer of conductive material such as carbon black, applied in an "Ink" form by spraying, brushing, blade coating and the like. Suitable binders for the carbon ink may include synthetic rubbers like butyl rubber, as in Eccocoat 258A ink supplied by Emerson & Cumming Co. The use of these thin, easily applied layers, results in cheaper, easier to manufacture substrates as alternatives to the lamination process required when two polyethylene binder-conductive powder layers are employed. The ink may include a solvent or may be applied in a paste form to create a layer of uniform thickness yielding good performance.

The conductive metal oxide binder layers useful in the present invention may vary in thickness, depending on the applications. Thicknesses in the range of 0.005 inch to about 0.1 inch, more preferably 0.005 to 0.020 inch are preferred. Carbon-binder laminate layers may have similar thicknesses, while the carbon "ink" type layers referred to above are considerably thinner, e.g. 0.001 to 0.005 inches, with 0.001 to 0.003 inches being most preferred.

Proceeding now to the schematic illustrations, FIG. 1 shows a bipolar battery element 10 including a conductive metal oxide layer 12 laminated to a conductive carbon-binder layer 14. Negative active battery paste 16 is applied to layer 12, while the positive active battery material 18 is applied to the carbon layer 14. To reiterate a point made earlier in the "Background" section of this specification, this is an opposite orientation than that specifically taught in the Tekkanat, et al. '790 patent.

The conductive oxide layer has been found to have a resistivity approximately two orders of magnitude lower than that of the carbon filled polyethylene. In our testing, the preferred oxide is conductive molybdenum oxide, having an average particle size of about 10 microns and used at a fill rate of about 30 parts of $MoO_{2-x}$ to 70 parts of polyethylene, by volume. This was combined with a carbon black filled polyethylene layer in which the average particle size was 10 microns and the fill rate was about 80 parts of carbon to 20 parts of polyethylene, by volume. Layer thickness in our testing was about 0.015 inches for the conductive oxide layer 12 and about 0.015 inches for the carbon filled layer 14.

Uses of bipolar electrode structures, in and of themselves are very well-known and will not be described here. Those skilled in the art will be able to adapt the foregoing teachings to specific desired structures and select appropriate layer thicknesses, fill rates (resultant conductivities) for particular applications. The type of paste materials can also be selected using known techniques to create a battery element having desired characteristics.

FIG. 2 shows another embodiment of the invention, similar in may respects to FIG. 1, except that the carbon-binder layer 14 has been replaced by a carbon "ink" layer 24.

Quick comparison of the two figures will show that layer 24 is considerably thinner than layer 14, even in the schematic illustration, and as mentioned earlier, layer 14 can comprise a sprayed or brushed coating having a high concentration of carbon held together by the rubber or other binder. In our testing to date, the preferred "ink" layer 14 is made by combining carbon powder, a rubber binder and solvent (Eccocoat 258a, commercially available from Emerson & Cumming). The resultant ink was then brushed onto the conductive oxide layer to a thickness of about 0.001 inch.

The comparative resistivities of a carbon filled polyethylene binder layer such as 14 and an ink type layer, such as 24, will, of course, vary depending on the compositions, fill rates and the like, but we have readily demonstrated that improved, dual layer laminates may be made using the very thin "ink" layers 24, thereby permitting considerable flexibility in overall battery design.

Now that two examples of the present invention have been described in connection with schematic illustrations thereof, the applicability and scope of the invention should be appreciated by those skilled in the art, especially the importance of the discovery of using the conductive metal oxide layer at the negative side of the battery element. Accordingly, while the invention has been illustrated by only two embodiments, it is not to be limited thereby, but it is to be limited solely by the scope of the claims which follow.

What is claimed is:

1. A method of using a bipolar electrode element, which element comprises a laminated substrate including a first layer comprising a particulate conductive metal oxide dispersed in a resin binder, and a second layer comprising particulate carbon material dispersed in a resin binder, the metal oxide being selected from the group consisting of barium metaplumbate and the conductive oxides of titanium, tungsten, vanadium, niobium and molybdenum, a negative electrode material applied to the first layer, and a positive electrode material applied to the second layer, which method comprises:

employing the first layer at the negative side of a bipolar electrical element;

employing the second layer at the positive side of the bipolar electrical element.

2. The method of claim 1, wherein the thickness of the first layer is between about 0.005–0.1 inch.

3. The method of claim 1, wherein the thickness of the second layer is between about 0.001–0.02 inch.

4. The method of claim 2, wherein the thickness of the second layer is between about 0.001–0.02 inch.

5. The method of claim 1, wherein the conductive metal oxide consists essentially of barium metaplumbate.

6. The method of claim 1, wherein the resin binder is a polyolefin.

7. The method of claim 1, wherein the particle size of the conductive metal oxide is in the range of 0.1 to 300 microns.

8. The method of claim 7, wherein the particle size of the conductive metal oxide is in the range of 0.1 to 40 microns.

9. The method of claim 1, wherein the first layer comprises 10-95 parts by volume of the conductive oxide and 90-5 parts by volume of the binder.

10. The method of claim 1, wherein the second layer comprises 10-95 parts by volume of the conductive oxide and 90-5 parts by volume of the binder.

11. The method of claim 1, wherein the particle size of the carbon is in the range of 0.1 to 300 microns.

12. The method of claim 11, wherein the carbon has an average particle size in the range of 0.1 to 40 microns.

13. The method of claim 1, wherein the second layer is thinner than the first layer.

14. The method of claim 13, wherein the electrode element is formed by coating the conductive oxide layer with a liquid or paste containing the binder and the particulate carbon.

15. The method of claim 14, wherein the second layer binder comprises a synthetic rubber.

16. The method of claim 1, wherein the electrode element is formed by coating the conductive oxide layer with a liquid or paste containing the binder and the particulate carbon.

17. The method of claim 16, wherein the second layer binder comprises a synthetic rubber.

18. The method of claim 1, wherein the electrode element is a double-layered capacitor.

19. The method of claim 1, wherein the electrode element is a bipolar lead-acid battery electrode.

* * * * *